United States Patent [19]
Baek et al.

[11] Patent Number: 6,075,952
[45] Date of Patent: Jun. 13, 2000

[54] SEGMENTED EXPOSURE CAMERA FOR PARTIALLY PREEXPOSED FILM

[76] Inventors: Frank B. Baek, 829 E. Acacia Ave., #D, Glendale, Calif. 91205; Harry Mik Miller, 3893 Grenville Rd., University Heights, Ohio 44118

[21] Appl. No.: 09/105,296

[22] Filed: Jun. 26, 1998

[51] Int. Cl.$^7$ .................................................. G03B 17/02
[52] U.S. Cl. ........................ 396/535; 396/322; 396/340
[58] Field of Search .............................. 396/6, 316, 317, 396/322, 323, 335, 337, 340, 535

[56] References Cited

U.S. PATENT DOCUMENTS

| | | | |
|---|---|---|---|
| 4,352,555 | 10/1982 | Dobbs et al. | 355/77 |
| 5,142,311 | 8/1992 | Olson et al. | 354/120 |
| 5,187,512 | 2/1993 | Kirkendall | 354/120 |
| 5,546,146 | 8/1996 | Dobbs et al. | 396/322 X |
| 5,565,936 | 10/1996 | Kim et al. | 396/340 |

*Primary Examiner*—Howard B. Blankenship
*Attorney, Agent, or Firm*—Lyon & Lyon LLP

[57] ABSTRACT

A camera for partially preexposed, multiple exposure film including a body with an exposure well and a film track across the well. A lens is attached to the camera body at the other end of the exposure well. A mask which includes a plate and a substantially perpendicular flange is positioned at the back of the exposure well adjacent to the film track. The flange extends into the exposure well and is adhered to the wall thereof. The plate includes margins to overlap with the body of the camera about three sides around the exposure well. Another camera includes an asymmetrically arranged exposure well relative to the film track such that the body of the camera about the exposure well extends to cover the preexposed image segment on a multiple exposure film strip.

5 Claims, 2 Drawing Sheets

6,075,952

SEGMENTED EXPOSURE CAMERA FOR PARTIALLY PREEXPOSED FILM

BACKGROUND OF THE INVENTION

The field of the present invention is systems for creating segmented exposures on film.

Systems are known for processing film in such a way that captions and other images which are in addition to the image being photographed can be placed on film. Before the film is loaded into the camera, the film is exposed to repeated images. These images align with the areas within which a photographic image is to be placed on multiple exposure film. Tape has been placed at the film track across the exposure well of the camera to cover over the portion of the film preexposed to this image. The film is loaded in such a camera and aligned such that the preexposed images are in registry with the intended exposure areas. The camera is then used for its intended purpose, the film processed and pictures developed with a message such as "Happy Birthday" across the bottom of the picture.

The foregoing practice is of particular value for cameras which are considered disposable or recyclable. Such cameras are sold with the film already in place and registered. Preexposure of that film before loading in the camera becomes easily accomplished.

Such systems have had difficulties because of light entering the preexposed area during exposure of the picture image. This causes an unattractive transition zone and clouds the image on the preexposed segment.

SUMMARY OF THE INVENTION

The present invention is directed to cameras which include a camera body with an exposure well and a film track where the area reserved for a preexposure segment is shielded.

In a first separate aspect of the present invention, a mask is employed with the foregoing camera that includes a plate extending across a portion of the exposure well and beyond the margins thereof on three sides. A flange perpendicular and attached to the plate extends into the exposure well and is affixed to the camera therein. The flange enables appropriate placement of the plate such that coverage of the preexposed segment of the film avoids further exposure.

In a second separate aspect of the present invention, the exposure well is constructed relative to the film track such that the film extends asymmetrically across one end of the exposure well to exclude from the exposure well the preexposed segment of the film.

Accordingly, it is an object of the present invention to provide an improved camera for segmented exposures. Other and further objects and advantages will appear hereinafter.

DETAILED DESCRIPTION OF THE PREFERRED EMBODIMENTS

Figure 1:
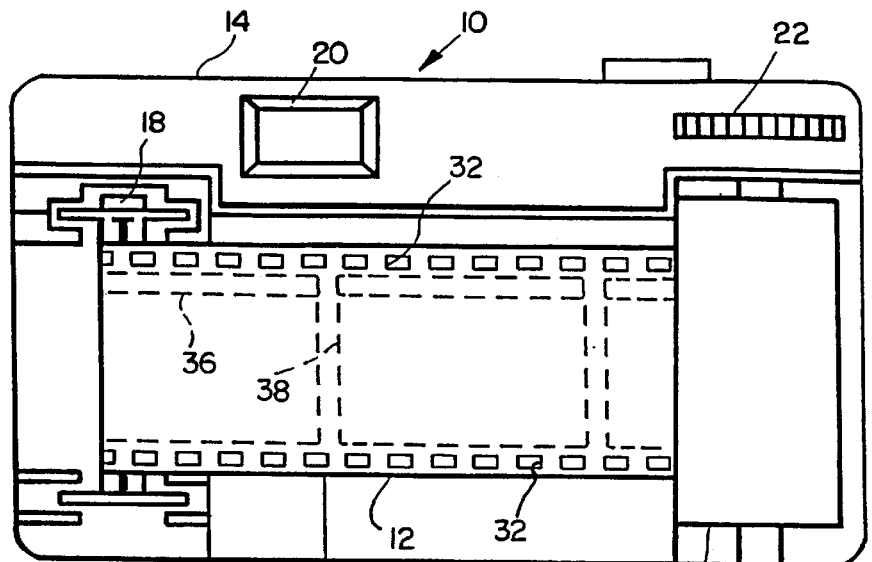
FIG. 1 is a back view of a camera with the back off and film loaded therein.

Turning in detail to the drawings, FIG. 1 illustrates the back view of a camera 10 with multiple exposure film 12 positioned therein. The camera includes a body 14 having a cavity for a film canister 16 to one side and a film reel 18 on the other. A viewfinder 20 and a winder 22 are also shown.

Figure 5:
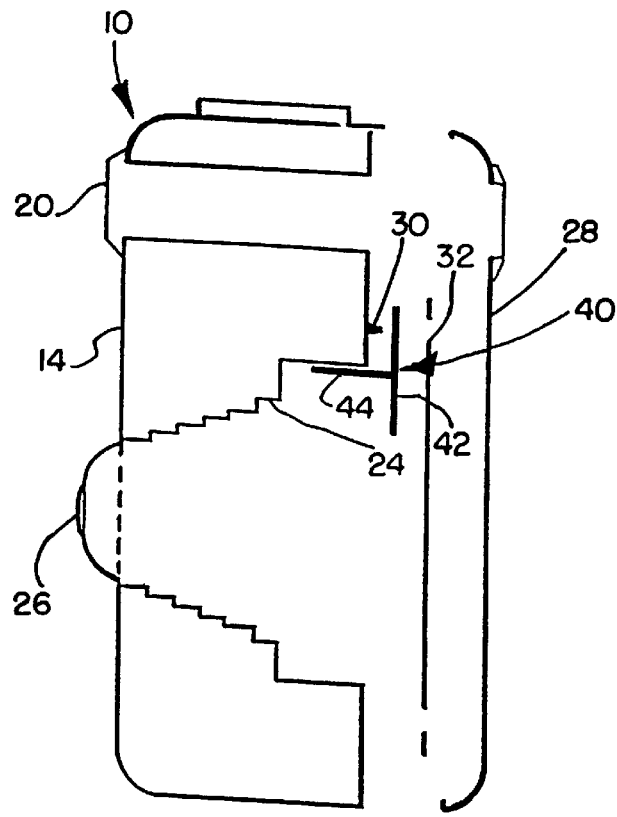
FIG. 5 is a schematic side cross-sectional view of a camera with a mask therein.

As more schematically illustrated in FIG. 5, an exposure well 24 extends through the camera body 14 from a lens 26 to adjacent the film track. In FIG. 5, the film 12 and a back 28 are shown in slightly exploded positions. A sprocket wheel 30 used to index the film and drive the film advance indicator is shown extending into the film path above the exposure well 24.

The multiple exposure film 12 is shown to be conventional in that it is retained within a cylindrical film canister 16 which may be wound from the end. The film 12 includes sprocket holes 32 top and bottom. With disposable or recyclable cameras which are preloaded upon manufacture, the film is typically wound onto the film reel 18 and is then advanced back into the film canister 16. Constrained by the back 28, the film 12 is held in a fixed plane at the exposure well 24. This insures a consistently focused image and the avoidance of partial exposure of adjacent image areas.

Figure 2:
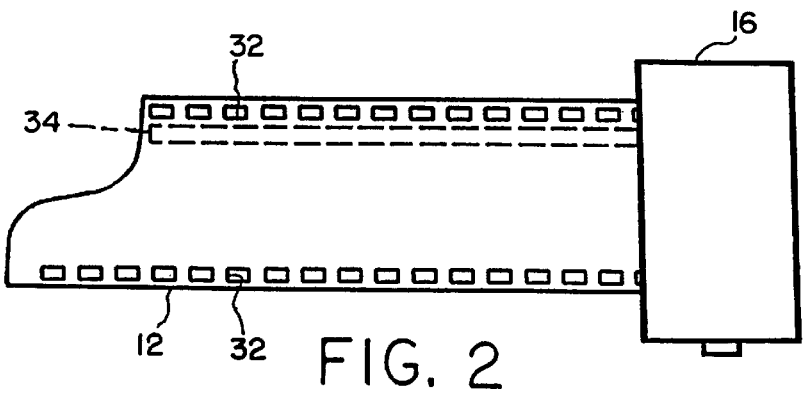
FIG. 2 is a back view of a film cartridge with film extending therefrom.

Represented in dotted lines in FIG. 2 is the preexposure area 34 on a strip of multiple exposure film 12. This area 34 is traditionally within the area of the normal exposure. Before loading the film 12 into the camera 10, this area 34 is preexposed to a message or other image as may be appropriately selected. Thus, the film is then contemplated to include preexposed image segments 36 to which image exposure segments 38 are then defined as being adjacent. The film 12 is carefully indexed in the camera 10 such that the preexposed image segments 36 will be aligned with the exposure well 24 to fill each image exposure segment 38 when a picture is taken.

Figure 3:
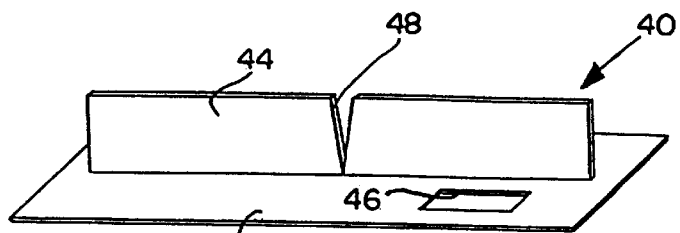
FIG. 3 is a perspective view of a mask.
Figure 4:
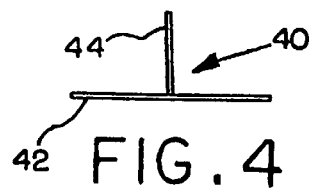
FIG. 4 is an end view of the mask of FIG. 3.

A mask, generally designated 40, includes a plate 42 having a flange 44 which extends into the exposure well 24. As can be seen from FIGS. 3 and 4, the flange 44 extends outwardly from the plate 42. Where the wall of the exposure well 24 is perpendicular to the lens plane, the flange 44 is also appropriately perpendicular to the plate 42. If the well 24 includes a tapered opening with the defining walls at angles to one another, the flange 44 may extend slightly off from true perpendicular to the plate 42. The plate 42 is sized to provide margins on three sides of the exposure well 24. The plate 42 extends over the body 14 to avoid the leakage of any light. The plate 42 also includes a sprocket hole 46 to expose the sprocket wheel 30. The plate 42 is preferably of an opaque resilient plastic material and is thin in order that it can be slightly bent.

The flange 44 is shorter than the plate 42 and is shown to include a V-shaped notch 48. The notch 48 accommodates some longitudinal compression and slight bending of the flange 44 and the plate 42. An adhesive may be placed on one side of the flange 44 in order that it can be adhered to the upper wall of the exposure well 24. The placement and adherence can accommodate a slight bowing backwardly of the plate 42 such that it better approaches the film 12 to cover the preexposed image segments 36. The flange 44 may also be slightly longer than the width between the lateral opposed walls of the exposure well 24 to insure such a bowing of the mask 40.

Figure 6:
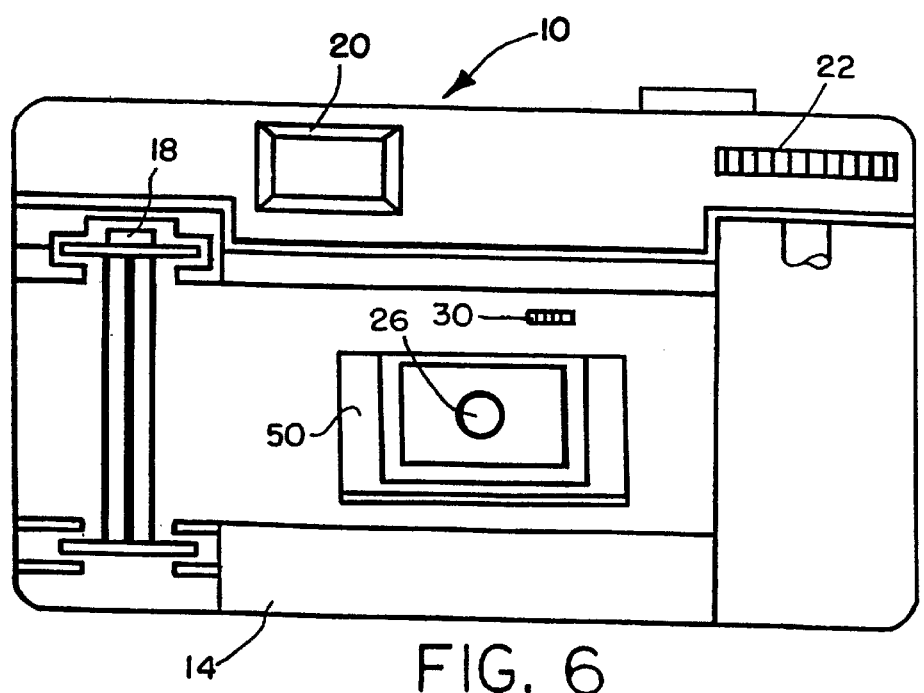
FIG. 6 is a back view of a camera with the exposure well asymmetric to the film track.

Turning to the embodiment of FIG. 6, the same reference numbers are applied where appropriate. In this embodiment, an exposure well 50 is shown to be asymmetrically arranged relative to the film track with the upper wall of the exposure well 50 displaced downwardly to provide the same coverage of the preexposure area 34 as the mask 40. The film sprocket holes 46 are, therefore, further from the exposure well 50 on one side of the film than on the other. This back of the camera body 14 may mimic the slightly bowed shape of the plate 42 when that feature is contemplated for a crisper division between the preexposed image segments 36 and the image exposure segments 38.

Accordingly, improved segment exposure camera equipment is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A camera for partially exposed, multiple exposure film, comprising a camera body including an exposure well and a film track across one end of the exposure well;

a lens attached to the camera body at the other end of the exposure well;

a mask including a plate extending across a portion of the exposure well at the film track and beyond the margins of the exposure well on three sides and a flange substantially perpendicular and attached to the plate and extending into the exposure well and affixed thereto.

2. The camera of claim 1, the flange having a notch cut therein.

3. The camera of claim 1, the flange being adhered to one wall of the exposure well.

4. The camera of claim 1, the plate having a film winder opening therethrough.

5. The camera of claim 2, the exposure well including lateral opposed walls, the flange being slightly longer than the width between the lateral opposed walls of the exposure well.

* * * * *